(12) United States Patent
Zhao et al.

(10) Patent No.: US 12,160,566 B2
(45) Date of Patent: Dec. 3, 2024

(54) METHOD AND APPARATUS FOR DETERMINING PREDICTION MODE WITH MODE STATUS

(71) Applicant: Huawei Technologies Co., Ltd., Shenzhen (CN)

(72) Inventors: Yin Zhao, Hangzhou (CN); Haitao Yang, Shenzhen (CN); Lian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 266 days.

(21) Appl. No.: 17/369,703

(22) Filed: Jul. 7, 2021

(65) Prior Publication Data

US 2021/0337189 A1  Oct. 28, 2021

Related U.S. Application Data

(63) Continuation of application No. PCT/CN2019/120822, filed on Nov. 26, 2019.

(30) Foreign Application Priority Data

Jan. 8, 2019  (CN) .......................... 201910016466.3
May 29, 2019 (CN) .......................... 201910457372.X

(51) Int. Cl.
*H04N 19/107* (2014.01)
*G06T 9/40* (2006.01)
(Continued)

(52) U.S. Cl.
CPC ............. *H04N 19/107* (2014.11); *G06T 9/40* (2013.01); *H04N 19/124* (2014.11);
(Continued)

(58) Field of Classification Search
CPC .... H04N 19/107; H04N 19/124; H04N 19/61; H04N 19/70; H04N 19/96; H04N 19/159;
(Continued)

(56) References Cited

U.S. PATENT DOCUMENTS 11,140,390 B2 * 10/2021 Park ..................... H04N 19/103
2013/0266074 A1 * 10/2013 Guo ..................... H04N 19/159
375/240.24

(Continued)

FOREIGN PATENT DOCUMENTS

CN  1750658 A   3/2006
CN  101394565 A  3/2009
(Continued)

OTHER PUBLICATIONS

"Series H: Audiovisual and Multimedia Systems, Infrastructure of audiovisual services—Coding of moving video, High efficiency video coding," Recommendation of ITU-T H.265, ITU-T Telecommunication Standardization Sector of ITU, pp. 1-692, International Telecommunication Union, Geneva, Switzerland (Feb. 2018).
(Continued)

*Primary Examiner* — Richard T Torrente
(74) *Attorney, Agent, or Firm* — Leydig, Voit & Mayer, Ltd.

(57) ABSTRACT

A prediction mode determining method and apparatus are described. A prediction mode status of a child node of a target node is determined based on an area and a split manner of the target node, where the prediction mode status includes intra prediction mode only and inter prediction mode only. Further, a prediction mode of the child node is determined based on the prediction mode status of the child node. In this way, a same prediction mode is used for all child nodes obtained by splitting the target node. This facilitates pipeline processing of hardware, increases a sub-
(Continued)

sequent processing speed, and improves video coding efficiency.

20 Claims, 3 Drawing Sheets

(51) Int. Cl.
    *H04N 19/124*     (2014.01)
    *H04N 19/61*     (2014.01)
    *H04N 19/70*     (2014.01)
    *H04N 19/96*     (2014.01)

(52) U.S. Cl.
    CPC ............. *H04N 19/61* (2014.11); *H04N 19/70* (2014.11); *H04N 19/96* (2014.11)

(58) Field of Classification Search
    CPC .. H04N 19/176; H04N 19/119; H04N 19/103; G06T 9/40
    See application file for complete search history.

(56) References Cited

U.S. PATENT DOCUMENTS

| | | | |
|---|---|---|---|
| 2013/0336394 A1* | 12/2013 | Tu ..................... | H04N 19/105 375/240.12 |
| 2014/0184740 A1 | 7/2014 | Zhang et al. | |
| 2015/0208094 A1 | 7/2015 | Lee et al. | |
| 2019/0182498 A1* | 6/2019 | Yamamoto ............. | H04N 19/96 |
| 2020/0077086 A1* | 3/2020 | Lee ..................... | H04N 19/96 |
| 2021/0112248 A1* | 4/2021 | Zhang ................... | H04N 19/61 |
| 2021/0211717 A1* | 7/2021 | Lee ..................... | H04N 19/176 |

FOREIGN PATENT DOCUMENTS

| | | |
|---|---|---|
| CN | 102098519 A | 6/2011 |
| CN | 103237216 A | 8/2013 |
| CN | 103444177 A | 12/2013 |
| CN | 104081777 A | 10/2014 |
| CN | 104202602 A | 12/2014 |
| CN | 104717498 A | 6/2015 |
| CN | 105850131 A | 8/2016 |
| CN | 106716999 A | 5/2017 |
| CN | 107079160 A | 8/2017 |
| CN | 107439014 A | 12/2017 |
| CN | 107637081 A | 1/2018 |
| CN | 108632608 A | 10/2018 |
| CN | 108668136 A | 10/2018 |
| CN | 108781289 A | 11/2018 |
| CN | 109151468 A | 1/2019 |
| CN | 109151477 A | 1/2019 |
| JP | 4921239 B2 | 4/2012 |
| WO | 2013039363 A2 | 3/2013 |
| WO | 2016074147 A1 | 5/2016 |
| WO | 2017222331 A1 | 12/2017 |
| WO | 2018047952 A1 | 3/2018 |
| WO | 2018088805 A1 | 5/2018 |

OTHER PUBLICATIONS

Bross et al., "Versatile Video Coding (Draft 2)," Joint Video Experts Team (JVET) of ITU-T SG 16 WP 3 and ISO/IEC JTC 1/SC 29 /WG 11, Document: JVET-K1001-v4, 11th Meeting: Ljubljana, SI, Total 84 pages (Jul. 10-18, 2018).

An et al., "CE1-related: Flexible Luma and Chroma Block Partitioning Trees Separation," Joint Video Experts Team (JVET) of ITU-T SG 16 WP 3 and ISO/IEC JTC 1/SC 29/WG 11, Document: JVET-L0184, 12th Meeting: Macao, CN, pp. 1-8 (Oct. 3-12, 2018).

* cited by examiner

METHOD AND APPARATUS FOR DETERMINING PREDICTION MODE WITH MODE STATUS

CROSS-REFERENCE TO RELATED APPLICATIONS

This application is a continuation of International Application No. PCT/CN2019/120822, filed on Nov. 26, 2019, which claims priority to Chinese Patent Application No. 201910016466.3, filed on Jan. 8, 2019 and claims priority to Chinese Patent Application No. 201910457372.X, filed on May 29, 2019. All of the aforementioned patent applications are hereby incorporated by reference in their entireties.

TECHNICAL FIELD

This application relates to the field of video coding technologies, and in particular, to a prediction mode determining method and apparatus.

BACKGROUND

With development of information technologies, video services such as high definition television, web conferencing, interactive personality television (IPTV), and three-dimensional (3D) television rapidly develop. Because of advantages such as intuitiveness and high efficiency, video signals become a main information obtaining manner in people's daily life. The video signals contain a large amount of data, and therefore need to occupy a large amount of transmission bandwidth and storage space. For effective transmission and storage of the video signals, the video signals need to be compressed and coded. Video coding (including video encoding and decoding) technologies have increasingly become indispensable key technologies in the field of video application.

An encoding process mainly includes steps such as intra prediction, inter prediction, transform, quantization, and entropy encoding (Entropy encode). Specifically, after a picture is split into coding tree units (CTUs) that do not overlap with each other, intra prediction or inter prediction is performed, and other corresponding processing is performed after the prediction, to finally output a bitstream. A decoding process is an inverse process of the encoding process.

However, in existing video coding, for some CTUs, if the CTU is further split, for example, a quadtree (QT)-based CTU split method is used to split the CTU in a quadtree split manner by using the CTU as a root node of a quadtree, the CTU may be split into different child nodes. If areas of these child nodes are less than a threshold (e.g., 64 or 128), and different prediction modes are used for the child nodes, it is unfavorable for pipeline processing of hardware, a subsequent processing speed is reduced, and finally coding efficiency is affected.

SUMMARY

This application provides a prediction mode determining method and apparatus, to improve video coding efficiency.

A first aspect of this application provides a prediction mode determining method. A prediction mode status of a child node of a target node is determined based on an area and a split manner of the target node, where the prediction mode status includes intra prediction mode only and inter prediction mode only. Further, a prediction mode of the child node is determined based on the prediction mode status of the child node. In this way, a same prediction mode is used for all child nodes obtained by splitting the target node. This facilitates pipeline processing of hardware, increases a subsequent processing speed, and improves video coding efficiency.

Optionally, the determining a prediction mode status of a child node of a target node based on an area of the target node and a split manner of the target node includes: when an area of the child node is less than a preset threshold, obtaining the prediction mode status of the child node by parsing a bitstream, where that the area of the child node is less than the preset threshold includes: binary tree split or quadtree split is used for the target node, and the area of the child node is 64 pixels; or extended quadtree split is used for the target node, and the area of the child node is 128 pixels.

Optionally, when the area of the child node is greater than or equal to the preset threshold, it is determined that the prediction mode status of the child node is a prediction mode status of the target node.

For example, when an area of a child node generated by splitting a node is less than the preset threshold, a prediction mode status of the child node is obtained by parsing a bitstream. When an area of a child node generated by splitting a node is greater than or equal to the preset threshold, a prediction mode status of the child node does not need to be obtained by parsing a bitstream, but it is directly determined that the prediction mode status of the child node is the prediction mode status of the target node, and then a prediction mode of the child node is determined based on the prediction mode status of the child node. It is constrained that a same prediction mode is used for child nodes generated by splitting a node. This facilitates pipeline processing of hardware and improves video coding efficiency.

Optionally, the obtaining the prediction mode status of the child node by parsing a bitstream includes: obtaining a value of a prediction mode flag by parsing the bitstream; and when the value of the prediction mode flag is a first preset value, determining that the prediction mode status of the child node is intra prediction mode only; or when the value of the prediction mode flag is a second preset value, determining that the prediction mode status of the child node is inter prediction mode only, where the first preset value is different from the second preset value.

Herein, when the value of the prediction mode flag is the first preset value, it is determined that prediction mode statuses of all child nodes of the node are an intra prediction mode. When the value of the prediction mode flag is the second preset value, it is determined that prediction mode statuses of all child nodes of the node are an inter prediction mode. In this way, the prediction mode status of the child node is obtained by parsing the bitstream, and then the prediction mode of the child node is determined based on the prediction mode status of the child node, so that a same prediction mode is used for all the child nodes obtained by splitting the node.

Optionally, the area of the target node is a product of the width and the height of the target node. Therefore, the area of the target node can be obtained simply and quickly after the width and the height of the target node are determined.

Optionally, the prediction mode status alternatively includes no intra/inter prediction mode constraint.

Herein, in addition to intra prediction mode only and inter prediction mode only, the prediction mode status of the child node of the target node alternatively includes no intra/inter prediction mode constraint, so that different application requirements on the prediction mode status of the child node in different application scenarios are further satisfied.

Optionally, the determining a prediction mode of the child node based on the prediction mode status of the child node includes: obtaining the prediction mode of the child node based on the prediction mode status of the child node by parsing the bitstream.

Optionally, the obtaining the prediction mode of the child node based on the prediction mode status of the child node by parsing the bitstream includes: when the prediction mode status of the child node is intra prediction mode only, obtaining an intra prediction flag of the child node by parsing the bitstream, to determine an intra prediction mode of the child node; or when the prediction mode status of the child node is no intra/inter prediction mode constraint, obtaining a skip mode flag and/or a direct mode flag and/or the prediction mode flag of the child node by parsing the bitstream, to determine the prediction mode of the child node.

Optionally, the obtaining the prediction mode of the child node based on the prediction mode status of the child node by parsing the bitstream includes: when the prediction mode status of the child node is inter prediction mode only or no intra/inter prediction mode constraint, obtaining a skip mode flag and/or a direct mode flag of the child node by parsing the bitstream, to determine the prediction mode of the child node.

For example, after the prediction mode status of the child node is determined, not all flags of the child node need to be obtained by parsing the bitstream, but only a flag corresponding to the prediction mode status of the child node needs to be obtained by parsing the bitstream, to determine the prediction mode of the child node.

Optionally, the method further includes: obtaining, based on the prediction mode of the child node, a reconstructed picture corresponding to the child node.

Optionally, the obtaining, based on the prediction mode of the child node, a reconstructed picture corresponding to the child node includes: performing prediction on the child node based on the prediction mode, to obtain a prediction picture of the child node; performing dequantization and/or inverse transform on residual information, to obtain a residual picture of the child node, where the residual information is obtained by parsing the bitstream; and superimposing the residual picture and the prediction picture, to obtain the reconstructed picture corresponding to the child node.

Herein, after the prediction mode of the child node is obtained, prediction may be performed on the child node based on the prediction mode to obtain the prediction picture of the child node, then dequantization and/or inverse transform are/is performed on the residual information to obtain the residual picture, and the residual picture is superimposed on the corresponding prediction picture, to generate the reconstructed picture.

Optionally, when the prediction mode status of the child node is intra prediction mode only, the prediction mode of the child node includes only an intra prediction mode.

Optionally, when the prediction mode status of the child node is inter prediction mode only, the prediction mode of the child node includes only an inter prediction mode.

Optionally, when the prediction mode status of the child node is no intra/inter prediction mode constraint, the prediction mode of the child node includes an inter prediction mode and an intra prediction mode.

For example, when the prediction mode status of the child node is intra prediction mode only, it is constrained that the prediction mode of the child node includes only the intra prediction mode. When the prediction mode status of the child node is inter prediction mode only, it is constrained that the prediction mode of the child node includes only the inter prediction mode. When the prediction mode status of the child node is no intra/inter prediction mode constraint, the prediction mode of the child node includes the inter prediction mode and the intra prediction mode.

A second aspect of this application provides a prediction mode determining apparatus, including: a first determining module, configured to determine a prediction mode status of a child node of a target node based on an area of the target node and a split manner of the target node, where the prediction mode status includes intra prediction mode only and inter prediction mode only; and a second determining module, configured to determine a prediction mode of the child node based on the prediction mode status of the child node.

Optionally, the first determining module is specifically configured to: when an area of the child node is less than a preset threshold, obtain the prediction mode status of the child node by parsing a bitstream, where that the area of the child node is less than the preset threshold includes: binary tree split or quadtree split is used for the target node, and the area of the child node is 64 pixels; or extended quadtree split is used for the target node, and the area of the child node is 128 pixels.

Optionally, the first determining module is further specifically configured to: when the area of the child node is greater than or equal to the preset threshold, determine that the prediction mode status of the child node is a prediction mode status of the target node.

Optionally, that the first determining module obtains the prediction mode status of the child node by parsing the bitstream includes: obtaining a value of a prediction mode flag by parsing the bitstream; and when the value of the prediction mode flag is a first preset value, determining that the prediction mode status of the child node is intra prediction mode only; or when the value of the prediction mode flag is a second preset value, determining that the prediction mode status of the child node is inter prediction mode only, where the first preset value is different from the second preset value.

Optionally, the area of the target node is a product of the width and the height of the target node.

Optionally, the prediction mode status alternatively includes no intra/inter prediction mode constraint.

Optionally, the second determining module is specifically configured to: obtain the prediction mode of the child node based on the prediction mode status of the child node by parsing the bitstream.

Optionally, that the second determining module obtains the prediction mode of the child node based on the prediction mode status of the child node by parsing the bitstream includes: when the prediction mode status of the child node is intra prediction mode only, obtaining an intra prediction flag of the child node by parsing the bitstream, to determine an intra prediction mode of the child node; or when the prediction mode status of the child node is no intra/inter prediction mode constraint, obtaining a skip mode flag and/or a direct mode flag and/or the prediction mode flag of the child node by parsing the bitstream, to determine the prediction mode of the child node.

Optionally, that the second determining module obtains the prediction mode of the child node based on the prediction mode status of the child node by parsing the bitstream includes: when the prediction mode status of the child node is inter prediction mode only or no intra/inter prediction mode constraint, obtaining a skip mode flag and/or a direct mode flag of the child node by parsing the bitstream, to determine the prediction mode of the child node.

Optionally, the method further includes: a reconstructed picture obtaining module, configured to obtain, based on the prediction mode of the child node, a reconstructed picture corresponding to the child node.

Optionally, the reconstructed picture obtaining module is specifically configured to: perform prediction on the child node based on the prediction mode, to obtain a prediction picture of the child node; perform dequantization and/or inverse transform on residual information, to obtain a residual picture of the child node, where the residual information is obtained by parsing the bitstream; and superimpose the residual picture and the prediction picture, to obtain the reconstructed picture corresponding to the child node.

Optionally, when the prediction mode status of the child node is intra prediction mode only, the prediction mode of the child node includes only an intra prediction mode.

Optionally, when the prediction mode status of the child node is inter prediction mode only, the prediction mode of the child node includes only an inter prediction mode.

Optionally, when the prediction mode status of the child node is no intra/inter prediction mode constraint, the prediction mode of the child node includes an inter prediction mode and an intra prediction mode.

A third aspect of this application provides a prediction mode determining apparatus, including: a processor, a memory, and a transceiver, where the memory is configured to store instructions, the transceiver is configured to communicate with another device, and the processor is configured to execute the instructions stored in the memory, so that the prediction mode determining apparatus performs the method according to the first aspect.

A fourth aspect of this application provides a computer-readable storage medium. The computer-readable storage medium stores instructions, and when the instructions are executed by a computing apparatus, a prediction mode determining apparatus is enabled to perform the method according to the first aspect.

This application provides a prediction mode parsing method. When an area of a child node generated by splitting a node is less than a threshold, a flag is parsed in a bitstream, and if the flag is 0, it is determined that only an inter prediction mode can be used for all child nodes of the node, or if the flag is 1, it is determined that only an intra prediction mode can be used for all child nodes of the node.

This application provides a prediction mode parsing method. When an area of a child node generated by splitting a node is less than a threshold, a flag does not need to be parsed from a bitstream, and it is determined that only an inter prediction mode can be used for all child nodes of the node.

This application provides a prediction mode parsing method. If only an inter prediction mode can be used for a node, cu_pred_mode is 0 by default. If only an intra prediction mode can be used for a node, skip_flag and direct_flag are 0 by default, and cu_pred_mode is 1 by default.

DESCRIPTION OF EMBODIMENTS

Figures 1A, 1B, 1C, 1D, 1E:
FIG. 1(a) to FIG. 1(e) are a schematic diagram of a binary tree split manner, a quadtree split manner, and an extended quadtree split manner according to this application.

In the embodiments of this application, the term "and/or" describes only an association relationship for describing associated objects and represents that three relationships may exist. For example, "A and/or B" may represent the following three cases: Only A exists, both A and B exist, and only B exists. In addition, in the descriptions of this application, "a plurality of" means two or more than two.

Example embodiments are described in detail herein, and examples thereof are shown in accompanying drawings. When the following description relates to the accompanying drawings, unless otherwise specified, same numbers in different accompanying drawings represent same or similar elements. Implementations described in the following example embodiments do not represent all implementations consistent with this application (or this disclosure). On the contrary, the implementations are merely examples of apparatuses and methods that are described in the appended claims in detail and that are consistent with some aspects of this application.

First, terms used in this application are explained.

Video coding typically refers to processing of a sequence of pictures, where the sequence of pictures forms a video or a video sequence. In the field of video coding, the terms "picture", "frame", and "image" may be used as synonyms. Video coding in this specification refers to video encoding or video decoding. Video encoding is performed on a source side, and usually includes processing (e.g., through compression) an original video picture to reduce an amount of data for representing the video picture (for more efficient storage and/or transmission). Video decoding is performed on a destination side, and usually includes inverse processing relative to an encoder to reconstruct the video picture. "Coding" of a video picture (or collectively referred to as a picture) in the embodiments should be understood as "encoding" or "decoding" of a video sequence. A combination of an encoding part and a decoding part is also referred to as coding (encoding and decoding).

In a case of lossless video coding, an original video picture may be reconstructed. To be specific, a reconstructed video picture has same quality as the original video picture (assuming that no transmission loss or other data loss occurs during storage or transmission). In a case of lossy video coding, further compression is performed through, for example, quantization, to reduce an amount of data for representing a video picture, but the video picture cannot be completely reconstructed on a decoder side. To be specific, quality of a reconstructed video picture is lower or poorer than that of the original video picture.

Each picture of a video sequence is usually split into a set of non-overlapping blocks, and coding is usually performed at a block level. To be specific, on an encoder side, a video is usually processed, that is, encoded, at a block (video block) level. For example, a prediction block is generated through spatial (intra) prediction and temporal (inter) prediction, the prediction block is subtracted from a current block (a block being processed or to be processed) to obtain a residual block, and the residual block is transformed in a transform domain and quantized to reduce an amount of data that is to be transmitted (compressed). On a decoder side, an inverse processing part relative to an encoder is applied to an encoded block or a compressed block to reconstruct the current block for representation. Furthermore, the encoder duplicates a processing loop of a decoder, so that the encoder and the decoder generate same prediction (e.g., intra prediction and inter prediction) and/or reconstruction, to process, that is, to code, subsequent blocks.

As used in this application, the term "block" may be a part of a picture or a frame. For ease of description, the embodiments of this application are described with reference to versatile video coding (VVC) or high efficiency video coding (HEVC) developed by the joint collaborative team on video coding (JCT-VC) of the ITU-T video coding experts group (VCEG) and the ISO/IEC moving picture experts group (MPEG). In HEVC, a coding tree unit is split into a plurality of coding units (CU) by using a quadtree structure represented as a coding tree. A CU is a coding unit, usually corresponds to an A×B rectangular region, and includes A×B luma pixels and chroma pixels corresponding to the luma pixels. A is the width of the rectangle, B is the height of the rectangle, and A and B may be the same or different. Values of A and B each are usually an integer power of 2, for example, 128, 64, 32, 16, 8, or 4. A coding unit may be decoded to obtain a reconstructed picture of an A×B rectangular region. The decoding usually includes processing such as prediction, dequantization, and inverse transform, to generate a prediction picture and a residual, and the reconstructed picture is obtained after the prediction picture and the residual are superimposed. A CTU is a coding tree unit. One picture includes a plurality of CTUs. One CTU usually corresponds to one square picture region, and includes a luma pixel and a chroma pixel in the picture region (or may include only a luma pixel or only a chroma pixel). The CTU further includes syntax elements, and these syntax elements indicate a method about how to split the CTU into at least one CU and decode each coding unit to obtain a reconstructed picture.

In latest development of video compression technologies, a quadtree split manner, a binary tree (BT) split manner, and an extended quadtree (EQT) split manner are used to split CTUs.

FIG. 1(a) to FIG. 1(e) describe the quadtree split manner, the binary tree split manner, and the extended quadtree split manner.

A quadtree is a tree structure, and indicates that one node can be split into four child nodes. In an existing video coding standard, a quadtree-based CTU split manner is used. A CTU is used as a root node, and each node corresponds to one square region. A node may not be split (in this case, a region corresponding to the node is a CU), or the node is split into four next-level nodes. In other words, the square region is split into four equal-sized square regions (the length and the width of each of the four equal-sized square regions are half of the length and the width of the region existing before the split), and each region corresponds to one node, as shown in FIG. 1(a).

A binary tree is a tree structure, and indicates that one node can be split into two child nodes. In an existing coding method in which the binary tree is used, a node on a binary tree structure may not be split, or the node is split into two next-level nodes. There are two manners of splitting a node into two nodes: (1) a horizontal binary split, where a region corresponding to the node is split into two equal-sized regions: an upper region and a lower region, and each region corresponds to one node, as shown in FIG. 1(b); or (2) a vertical binary split, where a region corresponding to the node is split into two equal-sized regions: a left region and a right region, and each region corresponds to one node, as shown in FIG. 1(c).

An extended quadtree is an 90 degree transposition H-shaped split structure, and one node can be split into four child nodes. There are two manners of splitting a node into four nodes: (1) a horizontal quad split, where a region corresponding to the node is split into four regions: an upper region, a middle right region, a middle left region, and a lower region, each region corresponds to one node, the heights of the four regions: the upper region, the middle left region, the middle right region, and the lower region are respectively ¼, ½, ½, and ¼ of the height of the node, and the widths of the middle left region and the middle right region are ½ and ½ of the width of the node, as shown in FIG. 1(d); or (2) a vertical quad split, where a region corresponding to the node is split into four regions: a left region, an upper middle region, a lower middle region, and a right region, each region corresponds to one node, the widths of the three regions: the left region, the upper middle region, the lower middle region, and the right region are respectively ¼, ½, ½, and ¼ of the height of the node, and the widths of the upper middle region and the lower middle region are ½ and ½ of the height of the node, as shown in FIG. 1(e). In an existing coding method in which the extended quadtree is used, a node on an extended quadtree structure may not be split, or the node is further split into next-level nodes in a BT manner or an EQT manner.

In an existing video coding standard, a picture is split into coding tree units (CTUs) that do not overlap with each other. A CTU size may be set to 64×64 (the CTU size may alternatively be set to another value, for example, the CTU size in JVET reference software JEM is increased to 128× 128 or 256×256). A 64×64 CTU includes a rectangular pixel array with 64 columns and 64 pixels per column, and each pixel includes a luma component and/or a chroma component.

A quadtree-based CTU split method is used to recursively split a CTU into several leaf nodes (leaf node) in a quadtree split manner by using the CTU as a root node of a quadtree. One node corresponds to one picture region. If a node is not split, the node is referred to as a leaf node, and a picture region corresponding to the node forms one CU. If a node is further split, a picture region corresponding to the node is split into four equal-sized regions (the length and the width of each of the four regions are respectively half of the length and the width of the split region), and each region corresponds to one node. Whether these nodes are to be further split needs to be separately determined. Whether a node is to be split is indicated by a split flag split_cu_flag that is in a bitstream and that corresponds to the node. A node A is split once into four nodes Bi, where i=0, 1, 2, or 3. Bi is referred to as a child node of A, and A is referred to as a parent node of Bi. A quadtree depth (qtDepth) of the root node is 0. A quadtree depth of a node is a quadtree depth of a parent node of the node plus 1. For brevity of description, in the following, a size and a shape of a node are a size and a shape of a picture region corresponding to the node.

For example, for a 64×64 CTU node (whose quadtree depth is 0), based on split_cu_flag corresponding to the CTU node, the CTU node may not be split and may be one 64×64 CU, or the CTU node may be split into four 32×32 nodes (whose quadtree depths are 1). Each of the four 32×32 nodes may be further split or may not be split based on split_cu_flag corresponding to the node. If a 32×32 node is further split, four 16×16 nodes (whose quadtree depths are 2) are generated. The rest may be deduced by analogy, until no node is further split. In this way, one CTU is split into a group of CUs. A minimum CU size is identified in a sequence parameter set (SPS). For example, an 8×8 CU is a minimum CU. In the foregoing recursive split process, if a size of a node is equal to the minimum CU size, it is considered by default that the node is not further split, and a split flag of the node does not need to be included in a bitstream.

After it is learned through parsing that a node is a leaf node, the leaf node is a CU, and coding information (including information such as a prediction mode and a transform coefficient of the CU, for example, a coding_unit( ) syntax structure in H.265) corresponding to the CU is further parsed. Then, decoding processing such as prediction, dequantization, inverse transform, and loop filtering is performed on the CU based on the coding information, to generate a reconstructed picture corresponding to the CU. The quadtree structure enables the CTU to be split into a group of CUs of appropriate sizes based on a local picture feature. For example, a smooth region is split into relatively large CUs, and a region with rich textures is split into relatively small CUs.

One manner of splitting a CTU into a group of CUs corresponds to one coding tree. A coding tree to be used for a CTU is usually determined by using a rate-distortion optimization (RDO) technology of an encoder. The encoder attempts a plurality of CTU split manners, and each split manner corresponds to one rate-distortion cost (RD cost). The encoder compares RD costs of various attempted split manners to find a split manner with minimum RD costs, and uses the split manner as an optimal split manner for the CTU to actually encode the CTU. The various CTU split manners attempted by the encoder all need to satisfy a split rule specified by a decoder, so that these CTU split manners can be correctly identified by the decoder.

It can be learned from the foregoing description that, in the existing coding standard, based on the quadtree split, the binary tree split manner and the extended quadtree split manner are added. In the existing coding standard, supported CU split shapes are shown in FIG. 1(a) to FIG. 1(e).

A quadtree is a tree structure, and one node can be split into four child nodes. A CTU is used as a root node, and each node corresponds to one square region. To be specific, the square region is split into four equal-sized square regions (the length and the width of each of the four equal-sized square regions are half of the length and the width of the region existing before the split), and each region corresponds to one node, as shown in FIG. 1(a).

One node is split into two child nodes through binary tree split. For example, there are two binary tree split manners:

(1) Horizontal binary split (horizontal binary tree, HBT): A region corresponding to the node is split into two equal-sized regions: an upper region and a lower region (to be specific, the widths remain unchanged, and the heights are half of the height of the region existing before the split), and each region corresponds to one node, as shown in FIG. 1(b).

(2) Vertical binary split (vertical binary tree, VBT): A region corresponding to the node is split into two equal-sized regions: a left region and a right region (to be specific, the heights remain unchanged, and the widths are half of the width of the region existing before the split), as shown in FIG. 1(c).

One node is split into four child nodes through extended quadtree split. For example, there are two extended quadtree split manners:

(1) Horizontal extended quadtree (horizontal Extended Quad-Tree, HEQT): A region corresponding to the node is split into four regions: an upper region, a middle left region, middle right region, and a lower region, where each region corresponds to one node, the heights of the four regions: the upper region, the middle left region, the middle right region, and the lower region are respectively ¼, ½, ½, and ¼ of the height of the node, and the widths of the middle left region and the middle right region are ½ and ½ of the width of the node, as shown in FIG. 1(d).

(2) Vertical extended quadtree (vertical Extended Quad-Tree, VEQT): A region corresponding to the node is split into four regions: a left region, an upper middle region, a lower middle region, and a right region, where each region corresponds to one node, the widths of the four regions: the left region, the upper middle region, the lower middle region, and the right region are respectively ¼, ½, ½, and ¼ of the width of the node, and the heights of the upper middle region and the lower middle region are ½ and ½ of the height of the node, as shown in FIG. 1(e).

After the foregoing various types of splits, a picture block at a leaf node location in a coding tree is used as a coding unit, and an encoding process mainly includes steps such as intra prediction, inter prediction, transform, quantization, entropy encoding, and in-loop filtering (which is mainly de-blocking filtering, de-blocking filtering). To be specific, after a picture is split into coding units, intra prediction or inter prediction is performed; after a residual is obtained, transform and quantization are performed; and finally entropy encoding is performed and a bitstream is output. Herein, the coding unit is an M×N array including pixels (M may be equal to N or may not be equal to N). In addition, a pixel value of each pixel location is known.

Intra prediction is to predict a pixel value of a pixel in a current picture block/coding unit by using a pixel value of a pixel in a reconstructed region in a current picture.

Inter prediction is as follows: A reconstructed picture is searched for a matched reference block for a current picture block/coding unit in a current picture, and a pixel value of a pixel in the reference block is used as prediction information or a prediction value (no distinction is made between information and value below) of a pixel value of a pixel in the current picture block/coding unit. This process is referred to as motion estimation (Motion estimation, ME). In addition, motion information of the current picture block/coding unit is transmitted.

It should be noted that the motion information of the current picture block/coding unit includes prediction direction indication information (which usually indicates forward prediction, backward prediction, or bidirectional prediction), one or two motion vectors (MV) that point to the reference block, and indication information (which is usually denoted as a reference frame index, Reference index) of the picture in which the reference block is located.

Forward prediction means selecting a reference picture from a forward reference picture set, to obtain a reference block for a current picture block/coding unit. Backward prediction means selecting a reference picture from a backward reference picture set, to obtain a reference block for a current coding unit. Bidirectional prediction means selecting a reference picture from each of a forward reference picture set and a backward reference picture set, to obtain reference blocks. When a bidirectional prediction method is used, the current coding unit has two reference blocks. Each reference block needs to be indicated by using a motion vector and a reference frame index, and then a prediction value of a pixel value of a pixel in the current block is determined based on pixel values of pixels in the two reference blocks.

In a motion estimation process, a plurality of reference blocks in the reference picture need to be attempted for the current picture block/coding unit, and which reference block or blocks are finally used for prediction is determined through rate-distortion optimization (RDO) or another method.

After the prediction information is obtained through intra prediction or inter prediction, residual information is obtained by subtracting the corresponding prediction information from the pixel value of the pixel in the current picture block/coding unit. Then, the residual information is transformed by using a method such as a discrete cosine transform (DCT). Subsequently, a bitstream is obtained through quantization and entropy encoding. After a prediction signal and a reconstructed residual signal are added, a filtering operation further needs to be performed, to obtain a reconstructed signal. The reconstructed signal is used as a reference signal for subsequent encoding.

Decoding is an inverse process of encoding. Residual information is first obtained through entropy decoding, dequantization, and inverse transform, and a bitstream is decoded to determine whether intra prediction or inter prediction is used for a current coding unit. If intra prediction is used, prediction information is constructed based on a pixel value of a pixel in a surrounding reconstructed region according to a used intra prediction method. If inter prediction is used, motion information needs to be obtained through parsing, a reference block is determined in a reconstructed picture based on the motion information obtained through parsing, and a pixel value of a pixel in the block is used as prediction information. This process is referred to as motion compensation (MC). After the prediction information and the residual information are added, reconstructed information can be obtained through a filtering operation.

A QT plus BT/EQT split manner is used in AVS3. To be specific, a node on a first-level coding tree can be split into child nodes only in a QT split manner, a leaf node of the first-level coding tree is a root node of a second-level coding tree, a node on the second-level coding tree can be split into child nodes by using either of a BT split manner and an EQT split manner, and a leaf node of the second-level coding tree is a coding unit. It should be noted that when the BT split manner or the EQT split manner is used for a leaf node, only the BT split manner or the EQT split manner can be used for a leaf node of the leaf node, but the QT manner cannot be used. The audio video coding standard (AVS) is short for a series of standards in "Information Technology, Advanced Audio Video Coding", and includes four main technical standards: system, video, audio, and digital rights management, and support standards such as compliance testing.

In the conventional technology, some CU-level syntax structures are shown in Table 1. If a target node is no longer split into child nodes, the target node is a coding unit, and prediction information of the coding unit is parsed according to the following syntax structures.

TABLE 1 coding_unit( x0, y0, uiDepth, uiWidth, uiHeight ) {
...
skip_flag
if ( ! skipFlag ) {
direct_flag TABLE 1-continued ...
}
if ( ! directFlag )
cu_pred_mode
...
}

Herein, skip_flag is a flag of a skip mode, a value 1 indicates that the skip mode is used for a current CU, and a value 0 indicates that the skip mode is not used for a current CU.

direct_flag is a flag of a direct mode, a value 1 indicates that the direct mode is used for a current CU, and a value 0 indicates that the direct mode is not used for a current CU.

cu_pred_mode is a prediction mode flag of a coding unit, a value 1 indicates that an intra prediction mode is used for a current prediction unit, and a value 0 indicates that a regular inter prediction mode is used for a current prediction unit.

In existing video coding, for some CTUs, if the CTU is further split, for example, a quadtree-based CTU split method is used to split the CTU in a quadtree split manner by using the CTU as a root node of a quadtree, the CTU may be split into different child nodes. If areas of these child nodes are less than a threshold (e.g., 64 or 128), and different prediction modes are used for the child nodes, it is unfavorable for pipeline processing of hardware.

This application provides a prediction mode determining method. A same prediction mode (inter prediction or intra prediction) is used for nodes whose areas are less than a threshold S (e.g., S is 64 or 128), to facilitate pipeline processing of hardware.

For example, when an area of a child node generated by splitting a node is less than a threshold, a flag is parsed in a bitstream, and if the flag is 0, it is determined that only an inter prediction mode can be used for all child nodes of the node, or if the flag is 1, it is determined that only an intra prediction mode can be used for all child nodes of the node.

Figure 2:
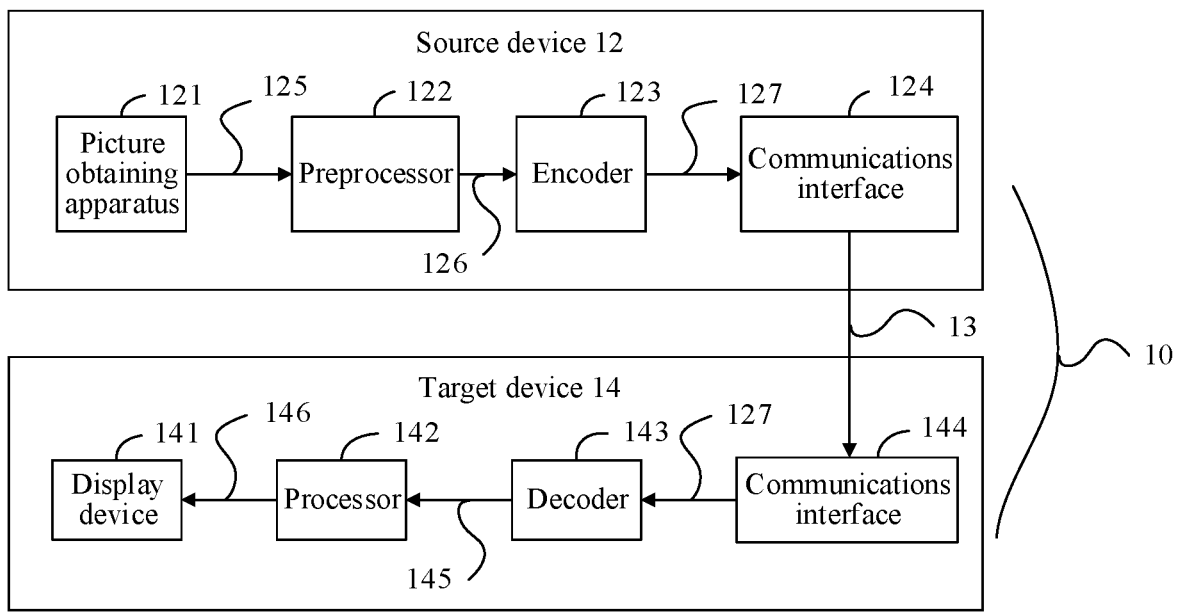
FIG. 2 is a block diagram of an example of a video coding system according to this application.

The method in this application is applied to a video encoder/decoder. A video coding system is shown in FIG. 2. The video coding system 10 includes a source device 12 and a target device 14. The source device 12 includes a picture obtaining apparatus 121, a preprocessor 122, an encoder 123, and a communications interface 124. The target device 14 includes a display device 141, a processor 142, a decoder 143, and a communications interface 144. The source device 12 sends, to the target device 14, encoded data 13 obtained through encoding. The method in this application is applied to the encoder 123 and the decoder 143.

The source device 12 may be referred to as a video encoding device or a video encoding apparatus. The target device 14 may be referred to as a video decoding device or a video decoding apparatus. The source device 12 and the target device 14 may be an example of a video coding device or a video coding apparatus.

The source device 12 and the target device 14 each may include any one of a wide range of devices, including any type of handheld or stationary device, for example, a notebook or laptop computer, a mobile phone, a smartphone, a tablet or tablet computer, a video camera, a desktop computer, a set-top box, a television, a display device, a digital media player, a video game console, a video streaming device (such as a content service server or a content delivery server), a broadcast receiver device, or a broadcast transmitter device, and may use or not use any type of operating system.

In some cases, the source device 12 and the target device 14 may be equipped for wireless communication. Therefore, the source device 12 and the target device 14 may be wireless communications devices.

In some cases, the video coding system 10 shown in FIG. 2 is merely an example, and the technologies in this application are applicable to video coding settings (e.g., video encoding or video decoding) that do not necessarily include any data communication between an encoding device and a decoding device. In other examples, data may be retrieved from a local memory, streamed over a network, or the like. The video encoding device may encode data and store encoded data into the memory, and/or the video decoding device may retrieve data from the memory and decode the data. In some examples, encoding and decoding are performed by devices that do not communicate with each other, but only encode data to the memory and/or retrieve data from the memory and decode the data.

In some cases, the encoder 123 in the video coding system 10 may also be referred to as a video encoder, and the decoder 143 may also be referred to as a video decoder. The encoder 123 and the decoder 143 may be configured to perform technologies such as intra prediction and inter prediction based on various examples described in this application.

In some cases, the picture obtaining apparatus 121 may include or be any type of picture capturing device configured to, for example, capture a real-world picture; and/or any type of device for generating a picture or comment (for screen content encoding, some text on a screen is also considered as a part of a to-be-encoded picture or image), for example, a computer graphics processor configured to generate a computer animation picture; or any type of device configured to obtain and/or provide a real-world picture or a computer animation picture (e.g., screen content or a virtual reality (VR) picture), and/or any combination thereof (e.g., an augmented reality (AR) picture). A picture is or may be considered as a two-dimensional array or matrix of samples with luminance values. The array is used as an example. A sample in the array may also be referred to as a pixel or a picture element (pel). Quantities of samples in horizontal and vertical directions (or axes) of the array define a size and/or resolution of the picture. For color representation, three color components are usually used. To be specific, the picture may be represented as or include three sample arrays. In an RBG format or color space, the picture includes corresponding red, green, and blue sample arrays. However, in video coding, each pixel is usually represented in a luma/chroma format or color space, for example, YCbCr, which includes a luminance (luma for short) component indicated by Y (sometimes indicated by L instead) and two chrominance (chroma for short) components indicated by Cb and Cr. The luma component Y represents luminance or gray level intensity (e.g., both are the same in a gray-scale picture), and the two chroma components Cb and Cr represent chrominance or color information components. Correspondingly, a picture in a YCbCr format includes a luma sample array of luma components (Y), and two chroma sample arrays of chroma components (Cb and Cr). A picture in an RGB format may be transformed or converted into a picture in a YCbCr format and vice versa. This process is also referred to as color conversion or transform.

Alternatively, the picture obtaining apparatus 121 may be, for example, a camera for capturing a picture, or a memory such as a picture memory, including or storing a previously captured or generated picture, and/or any type of interface (internal or external) for obtaining or receiving a picture. The camera may be, for example, a local camera, or an integrated camera integrated in the source device, and the memory may be a local memory or, for example, an integrated memory integrated in the source device. The interface may be, for example, an external interface for receiving a picture from an external video source. Herein, the external video source is, for example, an external picture capturing device such as a camera, an external memory, or an external picture generation device. The external picture generation device is, for example, an external computer graphics processor, a computer, or a server. In addition, the interface may be any type of interface, for example, a wired or wireless interface or an optical interface, according to any proprietary or standardized interface protocol. An interface for obtaining picture data 125 in FIG. 2 may be a same interface as the communications interface 124 or a part of the communications interface 124. The picture data 125 (e.g., video data) may be referred to as an original picture or original picture data.

In some cases, the preprocessor 122 is configured to receive the picture data 125 and perform preprocessing on the picture data 125 to obtain a preprocessed picture (or preprocessed picture data) 126. The preprocessing performed by the preprocessor 122 may include trimming, color format conversion (e.g., from RGB to YCbCr), color correction, or denoising. It may be understood that the preprocessor 122 may be an optional component.

In some cases, the encoder 123 (e.g., a video encoder) is configured to receive the preprocessed picture (or preprocessed picture data) 126 and provide encoded picture data 127.

In some cases, the communications interface 124 of the source device 12 may be configured to receive the encoded picture data 127 and transmit the encoded picture data 127 to another device, for example, the target device 14 or any other device, for storage or direct reconstruction. Alternatively, the communications interface 124 is configured to process the encoded picture data 127 before correspondingly storing the encoded data 13 and/or transmitting the encoded data 13 to another device. The another device is, for example, the target device 14 or any other device used for decoding or storage. The communications interface 144 of the target device 14 is configured to, for example, directly receive the encoded picture data 127 or the encoded data 13 from the source device 12 or any other source. The any other source is, for example, a storage device. The storage device is, for example, an encoded picture data storage device.

The communications interface 124 and the communications interface 144 may be configured to transmit or receive the encoded picture data 127 or the encoded data 13 through a direct communication link between the source device 12 and the target device 14 or through any type of network. The direct communication link is, for example, a direct wired or wireless connection. The any type of network is, for example, a wired or wireless network or any combination thereof, or any type of private or public network or any combination thereof. The communications interface 124 may be, for example, configured to package the encoded picture data 127 into an appropriate format, for example, a packet, for transmission over a communication link or a communications network. The communications interface 144 forming a part corresponding to the communications interface 124 may be, for example, configured to de-package the encoded data 13, to obtain the encoded picture data 127. Both the communications interface 124 and the communications interface 144 may be configured as unidirectional communications interfaces, as indicated by an arrow that points from the source device 12 to the target device 14 and that is used to indicate a transmission direction of the encoded picture data 127 in FIG. 2, or may be configured as bidirectional communications interfaces, and may be configured to, for example, send and receive messages to establish a connection, and acknowledge and exchange any other information related to a communication link and/or data transmission such as encoded picture data transmission.

In some cases, the decoder 143 is configured to receive the encoded picture data 127 and provide decoded picture data (or a decoded picture) 145.

In some cases, the processor 142 of the target device 14 is configured to post-process the decoded picture data (or the decoded picture) 145 such as a decoded picture, to obtain post-processed picture data 146, for example, a post-processed picture. The post-processing performed by the processor 142 may include, for example, color format conversion (e.g., from YCbCr to RGB), color correction, trimming, re-sampling, or any other processing to, for example, prepare the decoded picture data (or the decoded picture) 145 for display by the display device 141.

In some cases, the display device 141 of the target device 14 is configured to receive the post-processed picture data 145 to display a picture to, for example, a user or a viewer. The display device 141 may be or may include any type of display for presenting a reconstructed picture, for example, an integrated or external display or monitor. For example, the display may include a liquid crystal display (LCD), an organic light-emitting diode (OLED) display, a plasma display, a projector, a micro LED display, a liquid crystal on silicon (LCoS), a digital light processor (DLP), or any type of other displays.

In addition, although FIG. 2 depicts the source device 12 and the target device 14 as separate devices, a device embodiment may alternatively include both the source device 12 and the target device 14 or functionalities of both the source device 12 and the target device 14, that is, the source device 12 or a corresponding functionality and the target device 14 or a corresponding functionality. In such an embodiment, the source device 12 or the corresponding functionality and the target device 14 or the corresponding functionality may be implemented by using same hardware and/or software, separate hardware and/or software, or any combination thereof. Existence and (exact) division of functionalities of different units or functionalities of the source device 12 and/or the target device 14 shown in FIG. 2 may vary depending on an actual device and application.

In some cases, the encoder 123 (e.g., a video encoder) and the decoder 143 (e.g., a video decoder) each may be implemented as any of various suitable circuits, for example, one or more microprocessors, digital signal processors (DSP), application-specific integrated circuits (ASIC), field-programmable gate arrays (FPGA), discrete logic, hardware, or any combination thereof. If the technologies are implemented partially by using software, a device may store a software instruction in a suitable non-transitory computer-readable storage medium and may execute the instruction through hardware by using one or more processors, to perform the technologies in this application. Any one of the foregoing content (including hardware, software, a combination of hardware and software, and the like) may be considered as one or more processors. The encoder 123 and the decoder 143 each may be included in one or more encoders or decoders, and the encoder or the decoder may be integrated as a part of a combined encoder/decoder (codec) in a corresponding device.

It should be understood that for each of the foregoing examples described with reference to the encoder 123, the decoder 143 may be configured to perform a reverse process. With regard to signaling a syntax element, the decoder 143 may be configured to receive and parse such a syntax element and correspondingly decode related video data. In some examples, the encoder 123 may entropy-encode one or more defined syntax elements into an encoded video bitstream. In such examples, the decoder 143 may parse the syntax elements and correspondingly decode the related video data.

The following describes the technical solutions of this application by using several embodiments as examples. A same or similar concept or process may not be described in some embodiments.

Figure 3:
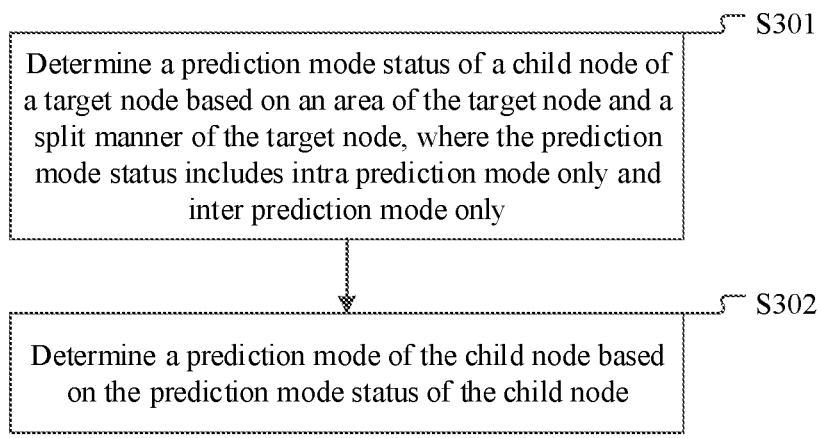
FIG. 3 is a schematic flowchart of a prediction mode determining method according to this application.

FIG. 3 is a schematic flowchart of a prediction mode determining method according to this application. As shown in FIG. 3, this embodiment relates to a block split manner in video decoding, and is used to determine a split manner of a target node of a coding tree. This embodiment is described from a decoder side. The method in this embodiment is as follows:

S301: Determine a prediction mode status of a child node of a target node based on an area of the target node and a split manner of the target node, where the prediction mode status includes intra prediction mode only and inter prediction mode only.

Herein, an example in which the target node is a CTU and the split manner is quadtree split is used. The CTU is used as a root node of a quadtree, and may be split into different child nodes in a quadtree split manner. Different prediction modes may be used for these child nodes. This is unfavorable for pipeline processing of hardware.

Before the determining a prediction mode status of a child node of a target node based on an area of the target node and a split manner of the target node, the method further includes: parsing the split manner of the target node. The split manner of the target node may be at least one of quadtree split, vertical binary split, horizontal binary split, vertical extended quadtree split, and horizontal extended quadtree split, or may be another split manner. This is not limited in this application. For example, information about the split manner of the target node is usually transmitted in a bitstream, and the split manner of the target node may be obtained by parsing a corresponding syntax element in the bitstream.

Optionally, the determining a prediction mode status of a child node of a target node based on an area of the target node and a split manner of the target node includes: when an area of the child node is less than a preset threshold, obtaining the prediction mode status of the child node by parsing a bitstream, where that the area of the child node is less than the preset threshold includes: binary tree split or quadtree split is used for the target node, and the area of the child node is 64 pixels; or extended quadtree split is used for the target node, and the area of the child node is 128 pixels.

Optionally, the area of the target node is a product of the width and the height of the target node.

For example, one of the following methods may be used to determine that the area of the child node generated after the target node is split is less than the preset threshold S:

Method 1: If BT split is used for the target node and sizeC/2 is less than the threshold S, or if QT split is used for the target node and sizeC/4 is less than the threshold S, or if EQT split is used for the target node and sizeC/4 is less than the threshold S, determine that the area of the child node generated after the target node is split is less than the threshold S. Herein, sizeC is the area of the target node, and the threshold S is a positive integer. For example, S is 64 or 32, and is 64 by default. In this embodiment of this application, if the width of the target node is W and the height of the target node is H, the area sizeC of the target node is a product of W and H.

Method 2: If BT split or QT split is used for the target node and the area of the target node is sizeC1, or if EQT split is used for the target node and the area of the target node is sizeC2, determine that the area of the child node generated after the target node is split is less than the threshold S. Herein, sizeC1 is 64 or 128, and sizeC2 is 128 or 256.

Method 3: If BT split is used for the target node and the area of the target node is sizeC1, or if EQT split is used for the target node and the area of the target node is sizeC2, determine that the area of the child node generated after the target node is split is less than the threshold S. Herein, sizeC1 is 64 or 128, and sizeC2 is 128 or 256.

Manner 4: If BT split is used for the target node and the area of the target node is sizeC1, determine that the area of the child node generated after the target node is split is less than the threshold S. Herein, sizeC1 is 64 or 128.

Method 5: If EQT split is used for the target node and the area of the target node is sizeC2, determine that the area of the child node generated after the target node is split is less than the threshold S. Herein, sizeC2 is 128 or 256.

Method 6: If QT split is used for the target node and the area of the target node is sizeC3, determine that the area of the child node generated after the target node is split is less than the threshold S. Herein, sizeC3 is 64 or 256.

Optionally, when the area of the child node is greater than or equal to the preset threshold, it is determined that the prediction mode status of the child node is a prediction mode status of the target node.

Optionally, the obtaining the prediction mode status of the child node by parsing a bitstream includes: obtaining a value of a prediction mode flag by parsing the bitstream; and when the value of the prediction mode flag is a first preset value, determining that the prediction mode status of the child node is intra prediction mode only; or when the value of the prediction mode flag is a second preset value, determining that the prediction mode status of the child node is inter prediction mode only, where the first preset value is different from the second preset value.

Optionally, the prediction mode status alternatively includes no intra/inter prediction mode constraint.

Figure 4:
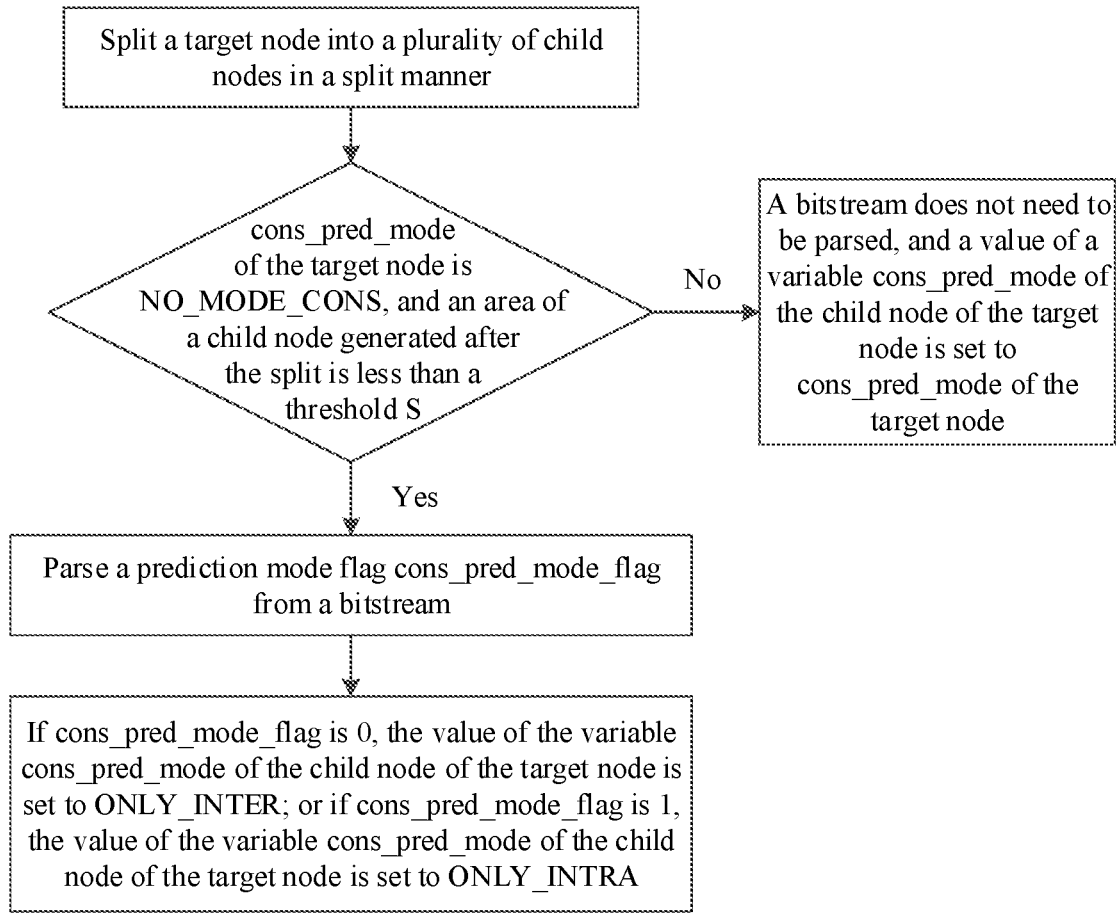
FIG. 4 is a flowchart of determining a cons_pred_mode value of a child node according to this application.

For example, in an embodiment, as shown in FIG. 4, the target node is split into a plurality of child nodes in a split manner. If cons_pred_mode of the target node is NO_MODE_CONS, whether the area of the child node generated after the split is less than the preset threshold S is determined. The variable cons_pred_mode has three status values in total. To be specific, when cons_pred_mode is equal to a first value ONLY_INTRA, it indicates that only an intra prediction mode can be used for the node, and an inter prediction mode is not allowed to be used, that is, intra prediction mode only. When cons_pred_mode is equal to a second value ONLY_INTER, it indicates that only an inter prediction mode can be used for the node, and an intra prediction mode is not allowed to be used, that is, inter prediction mode only. When cons_pred_mode is equal to a third value NO_MODE_CONS, it indicates that a prediction mode of the node is not constrained, and an intra prediction mode or an inter prediction mode is allowed to be used for the node, that is, no intra/inter prediction mode constraint. cons_pred_mode of a CTU node (that is, a root node of a coding tree) is set to NO_MODE_CONS.

If the area of the child node generated after the target node is split is less than the threshold S, the prediction mode flag cons_pred_mode_flag is parsed from the bitstream. If the area of the child node generated after the target node is split is not less than the threshold S, the bitstream does not need to be parsed, and a value of the variable cons_pred_mode of the child node of the target node is set to cons_pred_mode of the target node. In other words, the prediction mode status of the child node is set to the prediction mode status of the target node, and cons_pred_mode_flag does not need to be parsed from the bitstream. If cons_pred_mode_flag is 0, the value of the variable cons_pred_mode of the child node of the target node is set to ONLY_INTER; or if cons_pred_mode_flag is 1, the value of the variable cons_pred_mode of the child node of the target node is set to ONLY_INTRA.

For example, it is assumed that cons_pred_mode_flag is parsed for the target node, and the target node is split into two child nodes C1 and C2, where C1 may further be split into child nodes C10 and C11 of C1, C2 does not need to be further split and is directly one CU, and the child nodes C10 and C11 do not need to be further split and each are one CU. If cons_pred_mode_flag is 1, it is determined that cons_pred_mode of the child node of the target node is ONLY_INTRA. First, cons_pred_mode values of C1 and C2 are determined as ONLY_INTRA. Then, because the cons_pred_mode value of C1 is not equal to NO_MODE_CONS, cons_pred_mode values of the child nodes C10 and C11 of C1 are determined as the cons_pred_mode value (namely, ONLY_INTRA) of C1, and cons_pred_mode_flag does not need to be parsed for C1. Similarly, if cons_pred_mode_flag is 0, it is determined that cons_pred_mode of the child node of the target node is ONLY_INTER. In this case, cons_pred_mode values of C1, C10, and C11 are determined as ONLY_INTER.

Optionally, the foregoing intra prediction mode is a prediction mode in which a prediction value of a coding block is generated by using a spatial reference pixel in a picture in which the coding block is located, for example, a direct current mode (DC mode), a planar mode, an angular mode (angular mode), or a template matching mode.

The foregoing inter prediction mode is a prediction mode in which a prediction value of a coding block is generated by using a temporal reference pixel in a reference picture of the coding block, for example, a skip mode, a direct mode, or an AMVP (advanced motion vector prediction) mode, which is alternatively referred to as a regular inter mode.

S302: Determine a prediction mode of the child node based on the prediction mode status of the child node.

Optionally, the determining a prediction mode of the child node based on the prediction mode status of the child node includes: obtaining the prediction mode of the child node based on the prediction mode status of the child node by parsing the bitstream.

Optionally, the obtaining the prediction mode of the child node based on the prediction mode status of the child node by parsing the bitstream includes: when the prediction mode status of the child node is intra prediction mode only, obtaining an intra prediction flag of the child node by parsing the bitstream, to determine an intra prediction mode of the child node; or when the prediction mode status of the child node is no intra/inter prediction mode constraint, obtaining a skip mode flag and/or a direct mode flag and/or the prediction mode flag of the child node by parsing the bitstream, to determine the prediction mode of the child node.

Optionally, the obtaining the prediction mode of the child node based on the prediction mode status of the child node by parsing the bitstream includes: when the prediction mode status of the child node is inter prediction mode only or no intra/inter prediction mode constraint, obtaining a skip mode flag and/or a direct mode flag of the child node by parsing the bitstream, to determine the prediction mode of the child node.

Optionally, the method further includes: obtaining, based on the prediction mode of the child node, a reconstructed picture corresponding to the child node.

Optionally, the obtaining, based on the prediction mode of the child node, a reconstructed picture corresponding to the child node includes: performing prediction on the child node based on the prediction mode, to obtain a prediction picture of the child node; performing dequantization and/or inverse transform on residual information, to obtain a residual picture of the child node, where the residual information is obtained by parsing the bitstream; and superimposing the residual picture and the prediction picture, to obtain the reconstructed picture corresponding to the child node.

Optionally, when the prediction mode status of the child node is intra prediction mode only, only an intra prediction mode is used as the prediction mode of the child node.

Optionally, when the prediction mode status of the child node is inter prediction mode only, only an inter prediction mode is used as the prediction mode of the child node.

Optionally, when the prediction mode status of the child node is no intra/inter prediction mode constraint, an inter prediction mode and an intra prediction mode may be used as the prediction mode of the child node.

For example, for each child node of the target node, prediction information of each child node is parsed based on a cons_pred_mode value of the child node, and residual information of each child node is parsed from the bitstream.

If the child node is not split, the child node becomes a coding unit (a cons_pred_mode value of the coding unit is equal to a cons_pred_mode value of the node). If the child node is further split, a split manner of the child node is parsed, and the child node is recursively split, until a node is not split and becomes a coding unit.

The prediction information includes a prediction mode (indicating an intra prediction mode or a non-intra prediction mode), an intra prediction mode, an inter prediction mode, motion information, and the like. The motion information may include information such as a prediction direction (forward, backward, or bidirectional), a reference frame index (reference index), and a motion vector. The residual information includes a coded block flag (cbf), a transform coefficient, a transform type (e.g., DCT-2, DST-7, or DCT-8), and the like. The transform type may be DCT-2 transform by default.

Prediction mode information of each coding unit in the target node is parsed based on a cons_pred_mode value. A determining method is described as follows. An example syntax table is shown in Table 2.

TABLE 2 coding_unit( x0, y0, uiDepth, uiWidth, uiHeight, cons_pred_mode) {
...
if( cons_pred_mode != ONLY_INTRA)
skip_flag
...
if ( ! skipFlag ) {
if( cons_pred_mode != ONLY_INTRA)
direct_flag
...

TABLE 2-continued

}
if ( ! directFlag ) {
if( cons_pred_mode == NO_MODE_CONS )
cu_pred_mode
  ...
}
...
}

If cons_pred_mode=ONLY_INTER, it is constrained that an inter prediction mode is used for each coding unit in the target node. Correspondingly, values/a value of skip_flag and/or direct_flag are/is parsed, a value of cu_pred_mode does not need to be parsed, and cu_pred_mode is 0 by default. As shown in Table 2, when it is determined that a condition "cons_pred_mode is not equal to ONLY_INTRA" is not satisfied, flags skip_flag and direct_flag are not parsed, and when it is determined that a condition "cons_pred_mode is equal to NO_MODE_CONS" is not satisfied, cu_pred_mode is not parsed. For example, for a coding unit, if it is learned through parsing that skip_flag is 0 and direct_flag is 0, it is determined that a regular inter mode is used for the coding unit. Parsing is continued to obtain other prediction information.

If cons_pred_mode=ONLY_INTRA, it is constrained that an intra prediction mode is used for each coding unit in the target node. In this case, values of three syntax elements: skip_flag, direct_flag, and cu_pred_mode do not need to be parsed from the bitstream, where skip_flag is 0 by default, direct_flag is 0 by default, and cu_pred_mode is 1 by default. Subsequently, information such as an intra prediction flag continues to be parsed.

If cons_pred_mode=NO_MODE_CONS, a prediction mode of each coding unit in the target node is not constrained. For example, in this case, if it is learned through parsing that both skip_flag and direct_flag are 0, cu_pred_mode needs to be parsed.

In the foregoing process in which the prediction mode information of each coding unit in the target node is parsed based on the cons_pred_mode value, a parsing process of some prediction mode-related syntax elements of the node may be skipped, and not all syntax elements need to be parsed. For example, if only an inter prediction mode can be used for the node, cu_pred_mode is 0 by default. If only an intra prediction mode can be used for the node, skip_flag and direct_flag are 0 by default, and cu_pred_mode is 1 by default.

After a split manner of each CU and prediction information and residual information of each sub-region are obtained, inter prediction or intra prediction may be performed on each sub-region based on a prediction mode corresponding to each sub-region, to obtain an inter prediction picture or an intra prediction picture of each sub-region. Then, dequantization and/or inverse transform are/is performed on a transform coefficient based on the residual information of each sub-region, to obtain a residual picture, and the residual picture is superimposed on a prediction picture of the corresponding sub-region, to generate a reconstructed picture.

In this embodiment, for coding blocks whose areas are less than the threshold S (e.g., S is 64 or 128), a same prediction mode (same inter or intra prediction) is used, to facilitate pipeline processing of hardware. In addition, in inter prediction, a parsing process of some prediction mode-related syntax elements may be skipped, so that coding complexity is reduced.

In addition, this application further provides another prediction mode determining method. Inter prediction is used for a node whose area is less than a threshold S (e.g., S is 64 or 128), to facilitate pipeline processing of hardware.

For example, when an area of a child node generated by splitting a node is less than a threshold, a flag does not need to be parsed from a bitstream, and it is determined that only an inter prediction mode can be used for all child nodes of the node.

For example, a split manner of a target node is first parsed. If the target node is no longer split into child nodes, the target node is a coding unit, and coding unit information is parsed.

If the target node is further split, a value of a variable cons_pred_mode of a child node of the target node is determined based on an area of the target node, the split manner of the target node, and a value of a variable cons_pred_mode of the target node.

The variable cons_pred_mode has two status values in total. To be specific, when cons_pred_mode is equal to a second value ONLY_INTER, it indicates that only an inter prediction mode can be used for the node, and an intra prediction mode is not allowed to be used, that is, inter prediction mode only. When cons_pred_mode is equal to a third value NO_MODE_CONS, it indicates that a prediction mode of the node is not constrained, and an intra prediction mode or an inter prediction mode is allowed to be used for the node, that is, no intra/inter prediction mode constraint. cons_pred_mode of a CTU node (that is, a root node of a coding tree) is set to NO_MODE_CONS.

If cons_pred_mode of the target node is NO_MODE_CONS, and an area of the child node generated after the target node is split is less than the threshold S, the value of the variable cons_pred_mode of the child node of the target node is set to ONLY_INTER. Otherwise, that is, if an area of the child node generated after the target node is split is greater than or equal to the threshold S, the value of the variable cons_pred_mode of the child node of the target node is set to the value of the variable cons_pred_mode of the target node.

Then, for each child node of the target node, prediction information of each child node is parsed based on a cons_pred_mode value of the child node, and residual information of each child node is parsed from the bitstream.

If the child node is not split, the child node becomes a coding unit (a cons_pred_mode value of the coding unit is equal to a cons_pred_mode value of the node). If the child node is further split, a split manner of the child node is parsed, and the child node is recursively split, until a node is not split and becomes a coding unit.

Prediction mode information of each coding unit in the target node is parsed based on a cons_pred_mode value. A determining method is described as follows. An example syntax table is shown in Table 3.

TABLE 3

```
coding_unit( x0, y0, uiDepth, uiWidth, uiHeight, cons_pred_mode) {
...
skip_flag
...
if ( ! skipFlag ) {
direct_flag
...
}
```

TABLE 3-continued

```
if ( ! directFlag ) {
if( cons_pred_mode == NO_MODE_CONS )
cu_pred_mode
...
}
...
}
```

If cons_pred_mode=ONLY_INTER, it is constrained that an inter prediction mode is used for each coding unit in the target node. Correspondingly, values/a value of skip_flag and/or direct_flag are/is parsed, a value of cu_pred_mode does not need to be parsed, and cu_pred_mode is 0 by default. As shown in Table 3, when it is determined that a condition "cons_pred_mode is equal to NO_MODE_CONS" is not satisfied, cu_pred_mode is not parsed. For example, for a coding unit, if it is learned through parsing that skip_flag is 0 and direct_flag is 0, it is determined that a regular inter mode is used for the coding unit. Parsing is continued to obtain other prediction information.

If cons_pred_mode=NO_MODE_CONS, a prediction mode of each coding unit in the target node is not constrained. For example, in this case, if it is learned through parsing that both skip_flag and direct_flag are 0, cu_pred_mode needs to be parsed.

After a split manner of each CU and prediction information and residual information of each sub-region are obtained, inter prediction may be performed on each sub-region based on a prediction mode corresponding to each sub-region, to obtain an inter prediction picture of each sub-region. Then, dequantization and/or inverse transform are/is performed on a transform coefficient based on the residual information of each sub-region, to obtain a residual picture, and the residual picture is superimposed on a prediction picture of the corresponding sub-region, to generate a reconstructed picture.

In this embodiment, for a coding block whose area is less than the threshold S (e.g., S is 64 or 128), it is constrained that only the inter prediction mode is used, to facilitate pipeline processing of hardware. In addition, in inter prediction, a parsing process of some prediction mode-related syntax elements may be skipped, so that coding complexity is reduced.

Figure 5:
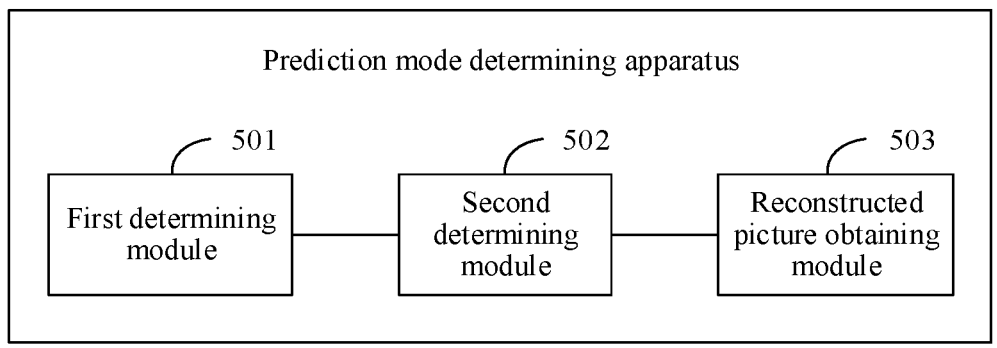
FIG. 5 is a schematic structural diagram of a prediction mode determining apparatus according to this application.

FIG. 5 is a schematic structural diagram of a prediction mode determining apparatus according to this application. The apparatus includes a first determining module 501 and a second determining module 502.

The first determining module 501 is configured to determine a prediction mode status of a child node of a target node based on an area of the target node and a split manner of the target node, where the prediction mode status includes intra prediction mode only and inter prediction mode only.

The second determining module 502 is configured to determine a prediction mode of the child node based on the prediction mode status of the child node.

Optionally, the first determining module 501 is specifically configured to: when an area of the child node is less than a preset threshold, obtain the prediction mode status of the child node by parsing a bitstream, where that the area of the child node is less than the preset threshold includes: binary tree split or quadtree split is used for the target node, and the area of the child node is 64 pixels; or extended quadtree split is used for the target node, and the area of the child node is 128 pixels.

Optionally, the first determining module 501 is further specifically configured to: when the area of the child node is greater than or equal to the preset threshold, determine that the prediction mode status of the child node is a prediction mode status of the target node.

Optionally, that the first determining module 501 obtains the prediction mode status of the child node by parsing the bitstream includes: obtaining a value of a prediction mode flag by parsing the bitstream; and when the value of the prediction mode flag is a first preset value, determining that the prediction mode status of the child node is intra prediction mode only; or when the value of the prediction mode flag is a second preset value, determining that the prediction mode status of the child node is inter prediction mode only, where the first preset value is different from the second preset value.

Optionally, the area of the target node is a product of the width and the height of the target node.

Optionally, the prediction mode status alternatively includes no intra/inter prediction mode constraint.

Optionally, the second determining module 502 is specifically configured to: obtain the prediction mode of the child node based on the prediction mode status of the child node by parsing the bitstream.

Optionally, that the second determining module 502 obtains the prediction mode of the child node based on the prediction mode status of the child node by parsing the bitstream includes: when the prediction mode status of the child node is intra prediction mode only, obtaining an intra prediction flag of the child node by parsing the bitstream, to determine an intra prediction mode of the child node; or when the prediction mode status of the child node is no intra/inter prediction mode constraint, obtaining a skip mode flag and/or a direct mode flag and/or the prediction mode flag of the child node by parsing the bitstream, to determine the prediction mode of the child node.

Optionally, that the second determining module 502 obtains the prediction mode of the child node based on the prediction mode status of the child node by parsing the bitstream includes: when the prediction mode status of the child node is inter prediction mode only or no intra/inter prediction mode constraint, obtaining a skip mode flag and/or a direct mode flag of the child node by parsing the bitstream, to determine the prediction mode of the child node.

Optionally, the apparatus further includes: a reconstructed picture obtaining module 503, configured to obtain, based on the prediction mode of the child node, a reconstructed picture corresponding to the child node.

Optionally, the reconstructed picture obtaining module 503 is specifically configured to: perform prediction on the child node based on the prediction mode, to obtain a prediction picture of the child node; perform dequantization and/or inverse transform on residual information, to obtain a residual picture of the child node, where the residual information is obtained by parsing the bitstream; and superimpose the residual picture and the prediction picture, to obtain the reconstructed picture corresponding to the child node.

Optionally, when the prediction mode status of the child node is intra prediction mode only, only an intra prediction mode is used as the prediction mode of the child node.

Optionally, when the prediction mode status of the child node is inter prediction mode only, only an inter prediction mode is used as the prediction mode of the child node.

Optionally, when the prediction mode status of the child node is no intra/inter prediction mode constraint, an inter prediction mode and an intra prediction mode may be used as the prediction mode of the child node.

Correspondingly, the apparatus in this embodiment may be configured to perform the technical solution in the embodiment shown in FIG. 3, implementation principles and technical effects are similar, and details are not described herein.

Figure 6:
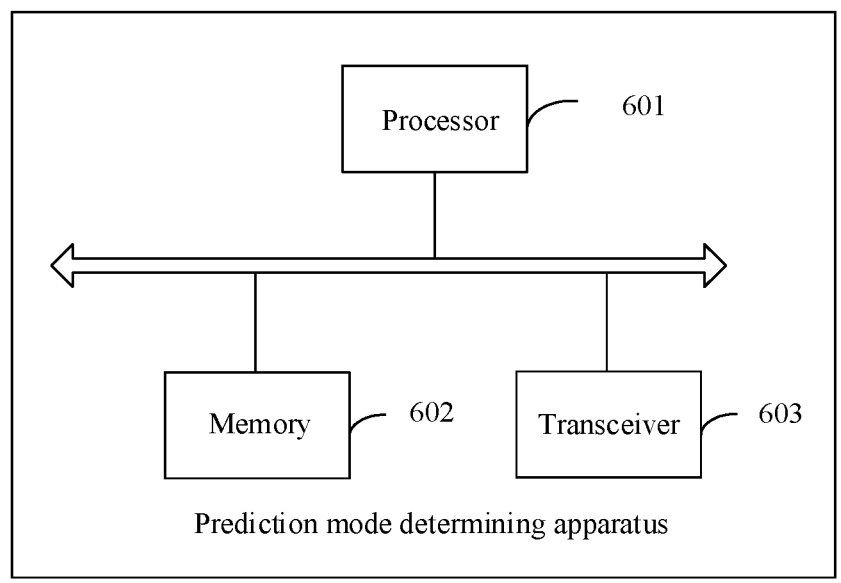
FIG. 6 is a schematic structural diagram of another prediction mode determining apparatus according to this application.

FIG. 6 is a schematic structural diagram of another prediction mode determining apparatus according to this application. The apparatus includes a processor 601, a memory 602, and a transceiver 603. The memory 602 is configured to store instructions. The transceiver 603 is configured to communicate with another device. The processor 601 is configured to execute the instructions stored in the memory, so that the prediction mode determining apparatus performs the technical solutions of any method in FIG. 3.

This application further provides a computer-readable storage medium. The computer-readable storage medium stores instructions, and when the instructions are executed by a computing apparatus, a prediction mode determining apparatus is enabled to perform the technical solutions of any method in FIG. 3.

In the embodiments of this application, the processor is configured to process data, and may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

For example, the processor may be a single-core (single-CPU) processor, or may be a multi-core (multi-CPU) processor.

In the embodiments, the memory is configured to store a computer instruction executed by the processor. The memory may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. The memory may be a unit independent of the processor, or may be a memory in the processor. This is not limited herein.

In the several embodiments provided in this application, it should be understood that the disclosed apparatus and method may be implemented in other manners. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one place, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of hardware plus a software functional unit.

What is claimed is:

1. A picture obtaining method incorporating a prediction mode determining method, comprising:
    determining a prediction mode status of a child node of a target node based on an area of the target node and a split manner of the target node, wherein the prediction mode status of the child node comprises intra prediction mode only or inter prediction mode only;
    determining a prediction mode of the child node based on the prediction mode status of the child node; and
    obtaining, based on the prediction mode of the child node, a reconstructed picture corresponding to the child node.

2. The method according to claim 1, wherein the determining a prediction mode status comprises:
    obtaining, in accordance with an area of the child node being less than a preset threshold, the prediction mode status of the child node by parsing a bitstream,
    wherein that the area of the child node is less than the preset threshold comprises:
        binary tree split or quadtree split is used for the target node, and the area of the child node is 64 pixels; or
        extended quadtree split is used for the target node, and the area of the child node is 128 pixels.

3. The method according to claim 2, wherein the method further comprises:
    determining, in accordance with the area of the child node being greater than or equal to the preset threshold, that the prediction mode status of the child node is a prediction mode status of the target node.

4. The method according to claim 2, wherein the obtaining the prediction mode status of the child node by parsing a bitstream comprises:
    obtaining a value of a prediction mode flag by parsing the bitstream; and
    determining the prediction mode status of the child node based on the value of the prediction mode flag by:
        determining, in accordance with the value of the prediction mode flag being a first preset value, that the prediction mode status of the child node is intra prediction mode only; or
        determining, in accordance with the value of the prediction mode flag being a second preset value, that the prediction mode status of the child node is inter prediction mode only,
        wherein the first preset value is different from the second preset value.

5. The method according to claim 1, wherein the area of the target node is a product of a width and a height of the target node.

6. The method according to claim 1, wherein the prediction mode status alternatively comprises no intra/inter prediction mode constraint.

7. The method according to claim 6, wherein the determining a prediction mode of the child node based on the prediction mode status of the child node comprises:
    obtaining the prediction mode of the child node based on the prediction mode status of the child node by parsing the bitstream.

8. The method according to claim 7, wherein the obtaining the prediction mode of the child node based on the prediction mode status of the child node by parsing the bitstream comprises:
    obtaining, in accordance with the prediction mode status of the child node being intra prediction mode only, an intra prediction flag of the child node by parsing the bitstream, to determine an intra prediction mode of the child node; or
    obtaining, in accordance with the prediction mode status of the child node being no intra/inter prediction mode constraint, obtaining a skip mode flag and/or a direct mode flag and/or the prediction mode flag of the child node by parsing the bitstream, to determine the prediction mode of the child node.

9. The method according to claim 7, wherein the obtaining the prediction mode of the child node based on the prediction mode status of the child node by parsing the bitstream comprises:
    obtaining, in accordance with the prediction mode status of the child node being inter prediction mode only or no intra/inter prediction mode constraint, obtaining a skip mode flag and/or a direct mode flag of the child node by parsing the bitstream, to determine the prediction mode of the child node.

10. The method according to claim 6, wherein when the prediction mode status of the child node is no intra/inter prediction mode constraint, the prediction mode of the child node comprises an inter prediction mode or an intra prediction mode.

11. The method according to claim 1, wherein the obtaining, based on the prediction mode of the child node, a reconstructed picture corresponding to the child node comprises:
    performing prediction on the child node based on the prediction mode, to obtain a prediction picture of the child node;
    performing dequantization and/or inverse transform on residual information, to obtain a residual picture of the child node, wherein the residual information is obtained by parsing the bitstream; and
    superimposing the residual picture and the prediction picture, to obtain the reconstructed picture corresponding to the child node.

12. The method according to claim 1, wherein when the prediction mode status of the child node is intra prediction mode only, the prediction mode of the child node comprises only an intra prediction mode.

13. The method according to claim 1, wherein when the prediction mode status of the child node is inter prediction mode only, the prediction mode of the child node comprises only an inter prediction mode.

14. The method of claim 1, wherein the prediction mode status of the child node of the target node is used for each child node obtained by splitting the target node.

15. A picture obtaining system incorporating a prediction mode determining apparatus, comprising:
    a processor; and
    a non-transitory computer-readable medium comprising computer-executable instructions that, when executed by the processor, cause the apparatus to carry out a method comprising:
    determining a prediction mode status of a child node of a target node based on an area of the target node and a split manner of the target node, wherein the prediction mode status of the child node comprises intra prediction mode only and inter prediction mode only;

determining a prediction mode of the child node based on the prediction mode status of the child node; and obtaining, based on the prediction mode of the child node, a reconstructed picture corresponding to the child node.

16. The system according to claim 15, wherein the method further comprises:

obtaining, in accordance with an area of the child node being less than a preset threshold, the prediction mode status of the child node by parsing a bitstream, wherein that the area of the child node is less than the preset threshold comprises:

binary tree split or quadtree split is used for the target node, and the area of the child node is 64 pixels; or extended quadtree split is used for the target node, and the area of the child node is 128 pixels.

17. The system according to claim 16, wherein the method further comprises:

determining, in accordance with the area of the child node being greater than or equal to the preset threshold, that the prediction mode status of the child node is a prediction mode status of the target node.

18. The system according to claim 16, wherein that the first determining module obtains the prediction mode status of the child node by parsing the bitstream comprises:

obtaining a value of a prediction mode flag by parsing the bitstream; and determining the prediction mode status of the child node based on the value of the prediction mode flag by:

determining, in accordance with the value of the prediction mode flag being a first preset value, that the prediction mode status of the child node is intra prediction mode only; or determining, in accordance with the value of the prediction mode flag being a second preset value, that the prediction mode status of the child node is inter prediction mode only, wherein the first preset value is different from the second preset value.

19. The system of claim 15, wherein the prediction mode status of the child node of the target node is used for each child node obtained by splitting the target node.

20. A non-transitory computer-readable storage medium, wherein the computer-readable storage medium stores instructions, and when the instructions are executed by a computing apparatus, a prediction mode determining apparatus is enabled to perform a picture obtaining method incorporating a prediction mode determining method, comprising:

determining a prediction mode status of a child node of a target node based on an area of the target node and a split manner of the target node, wherein the prediction mode status of the child node comprises intra prediction mode only or inter prediction mode only;

determining a prediction mode of the child node based on the prediction mode status of the child node; and obtaining, based on the prediction mode of the child node, a reconstructed picture corresponding to the child node.

* * * * *